W. J. BEAGLE.
ADJUSTABLE LUBRICATOR FOR LOOSE PULLEYS.
APPLICATION FILED JAN. 22, 1920.

1,367,764.

Patented Feb. 8, 1921.

Inventor
W. J. Beagle
By
Attorney

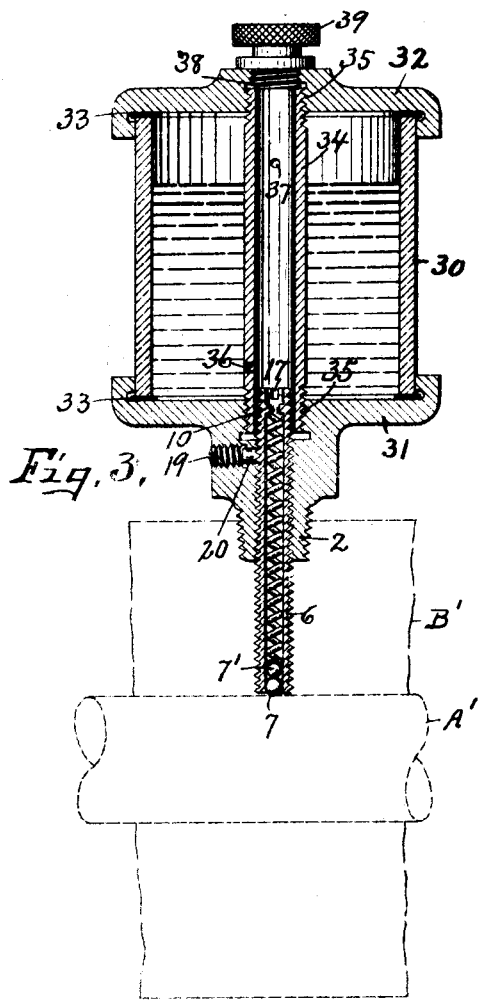

UNITED STATES PATENT OFFICE.

WILLIAM J. BEAGLE, OF SYRACUSE, NEW YORK, ASSIGNOR OF ONE-HALF TO JOHN M. STEVER, OF SYRACUSE, NEW YORK.

ADJUSTABLE LUBRICATOR FOR LOOSE PULLEYS.

1,367,764. Specification of Letters Patent. Patented Feb. 8, 1921.

Application filed January 22, 1920. Serial No. 353,277.

*To all whom it may concern:*

Be it known that I, WILLIAM J. BEAGLE, of Syracuse, in the county of Onondaga, in the State of New York, have invented new and useful Improvements in Adjustable Lubricators for Loose Pulleys, of which the following, taken in connection with the accompanying drawings, is a full, clear, and exact description.

This invention relates to certain improvements in lubricating devices for the bearings or rotary elements such as loose pulleys and shafts and refers more particularly to the construction of the oil container and feeding means for the lubricant.

One of the objects of the invention is to provide an efficient self oiler which will automatically distribute the lubricant evenly around the bearing of a revoluble element without excessive waste of the lubricant.

Another object is to permit the same lubricating device to be used on either a rotary element for lubricating a stationary bearing or upon a stationary bearing for lubricating a rotary element.

A further object is to transmit the lubricant to the bearing through the medium of a rotary element, such as a ball in contact with the bearing or with the rotary element.

A still further object is to provide means whereby the rotary contact and oil distributing member may be adjusted relatively to the bearing surfaces without disturbing the oil container or its connections with either the rotary or stationary element.

Other objects and uses relating to specific parts of the lubricating device will be brought out in the following description.

In the drawings:

Fig. 3 is a similar sectional view of a modified form of lubricating device adapted to be secured to either rotary or stationary elements.

Figure 1:
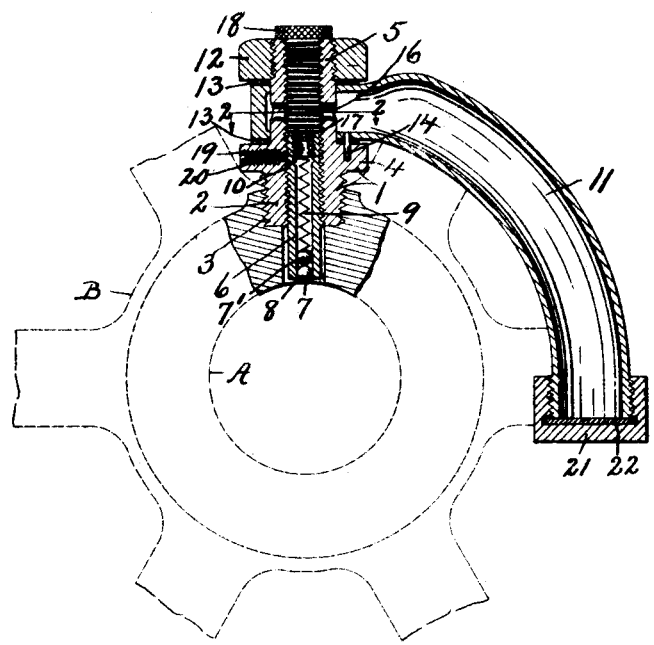
Figure 1 is a sectional view of a lubricating device embodying the various features of my invention as used upon rotary elements, such as loose pulleys.
Figure 2:
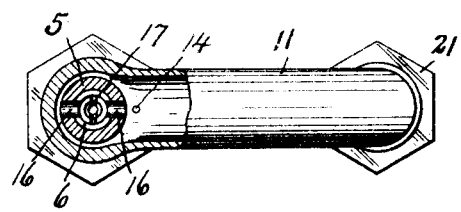
Fig. 2 is a detailed sectional view taken on line 2—2, Fig. 1.

In Fig. 1, I have shown a stationary bearing or shaft —A— and a rotary element, such as a loose pulley —B— journaled thereon together with my improved lubricating device adapted to be secured to the hub of the pulley for applying the lubricant to the surface of the bearing or shaft —A—.

This lubricating device comprises a bushing —1— having an externally threaded nipple —2— secured in a radial threaded socket —3— in the hub of the pulley —B—, said bushing being provided intermediate its ends with an angular portion —4— adapted to receive a wrench by which the bushing may be tightly screwed in the socket —3— and is also provided with an outwardly projecting coaxial extension —5— for a purpose presently described.

An externally threaded tubular member —6— is engaged with an internally threaded portion of the bushing —1— for radial adjustment and extends some distance beyond the inner end of said bushing, the extreme inner end of said tubular member being crimped inwardly for retaining a ball or roller bearing —7— which normally protrudes through the inner open end of the tubular member —6— beyond the ball seat as —8— for contact with the periphery of the shaft or bearing —A— for the purpose of transmitting and distributing the oil thereto.

In practice I prefer to use a second ball —7'— within the tube —6— just at the outside of and bearing against the ball —1— to permit the inner ball —7— to rotate freely under spring pressure without excessive friction as the pulley is rotated around the shaft.

A relatively light coil spring —9— is interposed between the outermost ball —7'— and a shoulder —10— on the outer end of the tube —6— for exerting inward pressure on said balls to cause the innermost ball to yieldingly contact with the periphery of the bearing —A—, said spring bring entirely enclosed within the tube —6—.

A circumferentially extending oil containing reservoir or chamber —11— is mounted at one end upon the extension —5— of the bushing —1— and is held in operative position by a clamping nut —12— engaged with the externally threaded portion of said extension and severing to tightly clamp the adjacent end of the reservoir —11— between the nut and the angular enlargement —4— with suitable interposed packings —13— at the joints to prevent leakage.

A stud —14— is secured in the outer face of the angular enlargement —4— and enters an aperture in the adjacent portion of the reservoir —11— to assist in holding said reservoir against rotation about the axis of the bushing —1—.

The reservoir —11— extends circumferentially of the shaft —A— in the direction of rotation of the pulley —B— and is preferably concentric with the axis of rotation so that the oil contained therein by its own inertia will be caused to travel in an opposite direction or toward the bushing as indicated by the arrow, Fig. 1, and in order that the oil may pass into the interior of said bushing, the extension —5— is surrounded by the oil chamber —11— and has one or more radial openings —16— registering with the interior of the adjacent end of the reservoir —11—, said extension being engaged in registering openings in the inner and outer walls or heads of said chamber.

The tube —6— is provided with an oil passage therethrough from end to end and this passage communicates with the interior of the bushing and, therefore, with the passages —16— and reservoir —11— so that the oil may pass from said reservoir through the tubular member —6— and in contact with the ball —7— which by reason of its rolling motion distributes the lubricant to the periphery of the bearing —A— in sufficient quantities to properly lubricate the same without excessive waste.

The use of the second of the outermost ball —7'— is only for the purpose of forming a bearing for the inner end of the spring —9— and to avoid the contact of said spring with the inner roller —7— which might interfere with the free rotation of the latter through excessive friction, the extra ball —7'— serving to reduce said friction to a minimum and at the same time transmitting the force of the spring to the innermost ball to hold the latter in contact with the bearing as the pulley is rotated.

The interior of the bushing —1— is also open from end to end to permit the adjustment of the tubular member —6— radially by turning movement which is effected by inserting a screw driver or similar tool in the open outer end of the bushing and engaging the same with the slot —17— in the outer end of the tubular member —6—, the object of said adjustment being to bring the innermost ball —7— into proper contact with the bearing —A— without disturbing any of the other parts of the lubricating device except the removal of a plug —18— which is normally screwed into the outer end of the bushing or extension —5— to close the same against the escape of oil when the pulley is in action.

When the tubular member —6— is properly adjusted it is locked in place by a set screw —19— and clamping block —20— both of which are radially disposed in an aperture in the enlarged portion —4— of the bushing as shown in Fig. 1, the clamping block —20— being preferably separate from the screw and has its inner end grooved to conform to the threads of the tube —6— so as to prevent mutilation of said threads when the set screw is tightened.

The free end of the reservoir —11— is normally closed by a screw cap —21— and suitable packing —22— to hold the lubricant in the receptacle without leakage and at the same time providing means whereby the reservoir may be filled with a lubricant by simply removing the cap —21— when the pulley is adjusted rotarily to bring the free end of the reservoir uppermost.

In installing the lubricating device upon the pulley, the bushing —1— containing the tube —6— and balls and spring therein is screwed tightly in the socket —3— in the hub of the pulley, after which the reservoir —11— is placed in proper position upon the extension —5— and clamped in place by the nut —12— whereupon the tubular member —6— may be adjusted by a screw driver in the manner previously described to bring the innermost ball into contact with the bearing —A— whereupon the tubular member —6— may be tightened by the set screw —19— and the outer end of the bushing closed by the plug —18—. The pulley may then be adjusted rotarily to bring the free end of the reservoir uppermost to permit said reservoir to be filled with oil after which the open end may be closed by the cap —21—, the device being then ready for operation.

In the construction shown in Fig. 3, the oil container comprises a cylinder —30— which is firmly held at its ends between inner and outer end heads —31— and —32— which fit over and upon the adjacent ends of said cylinder with suitable interposed packings —33— to prevent leakage, said heads being connected by a central tube —34— forming an extension of the bushing or inner head —31— through the oil chamber having its ends threaded and secured in threaded sockets —35— which open from the inner faces of the heads, said extension being provided with one or more radial passages —36— near the inner head —31— to permit the oil to pass from the interior of the cylinder —30— into the interior of the tube.

A vent hole —37— is formed in the tube near the outer head —32— to equalize the pressure therein and thereby assist the flow of the oil to the bearings in a manner presently described.

The cap —32— is provided with a central opening —38— alined with the interior of the tube —34— to permit the insertion of a screw driver or similar tool through the tube for adjusting the tubular member —6— in a manner similar to that previously described for the construction shown in Fig. 1, said opening —38— being normally closed by a plug —39—.

The inner head —31— is provided with a threaded nipple —2— similar to that previously described for insertion into a similarly threaded socket in the bearing to hold the lubricator in fixed relation thereto, said nipple —2— being threaded internally for receiving the tubular member —6— which is adjustable in the same manner as the similar member shown in Fig. 1 and contains a similar spring —9— and balls —7— and —7'— for distributing the oil to a revolving member within the bearing to be lubricated, said tube being locked in its adjusted position by set screw —19— and clamping block —20— similar to those previously described.

The device shown in Fig. 3 is adapted to be used in connection with a stationary bearing —B'— for lubricating a rotary shaft —A'— although it is evident that it could be used for the same loose pulley and shaft as shown in Fig. 1.

What I claim is:

1. A lubricator of the character described comprising an oil chamber, a bushing having an extension through said chamber and provided with means for attachment to one of the parts to be lubricated, said bushing and its extension having a lengthwise opening therethrough, the extension being provided with branch openings communicating with the oil chamber, a delivery tube adjustable lengthwise of and within said opening and provided with a central lengthwise passage communicating with the interior of the extension, and a ball seated in the inner end of the delivery tube for rolling engagement with the other part to be lubricated, the lengthwise opening in the extension being sufficiently large in diameter to permit the passage of the delivery tube therethrough.

2. A lubricator of the character described having an oil chamber and a tubular member extending through the oil chamber and provided with a central lengthwise opening therethrough from end to end and also provided with branch passages connecting said opening with the chamber, a delivery tube adjustable lengthwise of and within said tubular member and provided with a lengthwise passage from end to end, the opening in the tubular member being of sufficient size to permit the passage of the delivery tube therethrough, a ball seated in the inner end of the delivery tube for rolling contact with one of the parts to be lubricated, and means for holding the delivery tube in its adjusted position.

3. In a lubricator of the character described, an oil containing chamber, a tubular member extending through the chamber and provided with lateral passages communicating therewith, a delivery tube adjustable lengthwise of and within said member, means for holding the delivery tube in its adjusted position, a ball in said tube for rolling contact with one of the parts to be lubricated and a spring within the delivery tube for holding the ball in contact with said part.

4. In combination with relatively rotatable parts, a lubricating device having an oil chamber elongated circumferentially about said parts and having both ends closed, a tubular member extending through the inner and outer walls of said chamber near one end thereof and provided with passages communicating with interior of the chamber, said chamber having its interior communicating with one of the parts to be lubricated, and means for securing said member to said part.

5. The combination with relatively rotatable elements, of a lubricating device having a tubular bushing secured to one of said elements, said bushing having a tubular extension provided with branch passages through the walls thereof, an oil chamber surrounding said extension and communicating with said passages, said chamber extending circumferentially from the extension in the direction of rotation of the rotatable element, the end of the reservoir farthest from the tubular member being closed.

6. The combination with relatively rotatable elements, of a lubricating device having an oil chamber extending circumferentially around the axis of the rotatable part and closed at both ends, a bushing secured in said rotatable part and provided with an extension through the inner and outer walls of the chamber between the closed ends thereof, said bushing and its extension being provided with a central lengthwise opening therethrough and communicating with the interior of the oil chamber, and a delivery tube adjustable lengthwise of and within the opening in the bushing and its extension for feeding the oil from said opening to the bearing between said elements.

7. In combination with relatively rotatable parts, a bushing secured to one of said parts and provided with a tubular extension, a delivery tube adjustable lengthwise of and within said extension, means for holding the delivery tube in its adjusted position, a ball in the inner end of the delivery tube for contact with the other part to be lubricated, a reservoir having one end secured to said extension and communicating with the interior thereof, said reservoir extending circumferentially from the bushing in the direction of rotation of the rotatable part and having its other end closed.

In witness whereof I have hereunto set my hand this 16th day of January, 1920.

WILLIAM J. BEAGLE.

Witness:
H. E. CHASE.